(12) United States Patent
Adler

(10) Patent No.: US 6,168,361 B1
(45) Date of Patent: Jan. 2, 2001

(54) LOCKNUT

(76) Inventor: Alan J. Adler, 752 La Para Ave., Palo Alto, CA (US) 94306

(*) Notice: Under 35 U.S.C. 154(b), the term of this patent shall be extended for 0 days.

(21) Appl. No.: 09/338,948

(22) Filed: Jun. 23, 1999

Related U.S. Application Data

(63) Continuation-in-part of application No. 09/244,185, filed on Feb. 4, 1999, now abandoned.

(51) Int. Cl.⁷ ............................ F16B 37/08; F16B 37/16
(52) U.S. Cl. .......................... 411/433; 411/324; 411/437; 411/937.1
(58) Field of Search .................... 411/222, 277, 411/282, 324, 433, 437, 937.1

(56) References Cited

U.S. PATENT DOCUMENTS

| | | | |
|---|---|---|---|
| 516,285 | 3/1894 | Vaughan | 411/222 |
| 696,998 | 4/1902 | McLean | 411/222 |
| 961,063 * | 6/1910 | Austin | 411/937.1 |
| 1,013,521 | 1/1912 | Swenson | 411/222 |
| 1,181,248 * | 5/1916 | Posson | 411/937.1 |
| 1,375,781 | 4/1921 | De Long . | |
| 1,394,730 | 10/1921 | Hayter et al. | 411/222 |
| 1,722,783 | 7/1929 | Basseches . | |
| 2,172,461 | 9/1939 | Whitescarver . | |
| 2,386,296 | 10/1945 | De Fazi . | |
| 2,490,728 | 12/1949 | Cox | 411/324 |
| 2,797,606 | 7/1957 | Poupitch . | |
| 2,901,938 | 9/1959 | Van Buren, Jr. . | |
| 2,931,264 | 4/1960 | Dallman . | |
| 2,932,898 | 4/1960 | Enders . | |
| 3,052,130 | 9/1962 | Kellogg et al. . | |
| 3,501,828 | 3/1970 | Schultz . | |
| 5,074,731 | 12/1991 | Schneider | 411/433 |

FOREIGN PATENT DOCUMENTS

| | | | |
|---|---|---|---|
| 681489 | 2/1930 | (FR) | 411/222 |
| 291426 | 2/1928 | (GB) | 411/222 |
| 349594 | 6/1931 | (GB) | 411/282 |
| 471517 | 5/1952 | (IT) | 411/222 |

* cited by examiner

Primary Examiner—Neill Wilson
(74) Attorney, Agent, or Firm—Townsend and Townsend and Crew LLP

(57) ABSTRACT

A locknut according comprises a C-shaped nut with a radial gap cut through one side. The locknut functionality is provided by making the threads of the nut undersize, by deforming the C-shape inward such that the internal threads are out of round until the nut is assembled on a screw, or by twisting the nut so as to axially displace the threads on opposite sides of the gap.

6 Claims, 1 Drawing Sheet

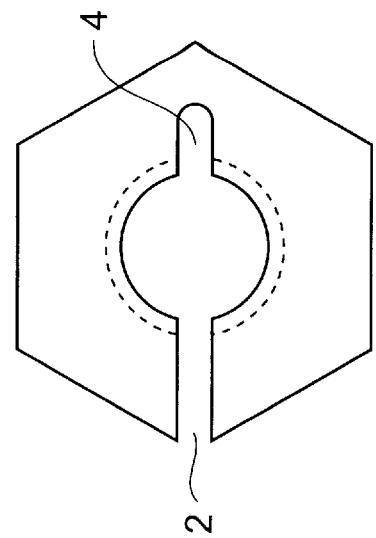
FIG. 5A
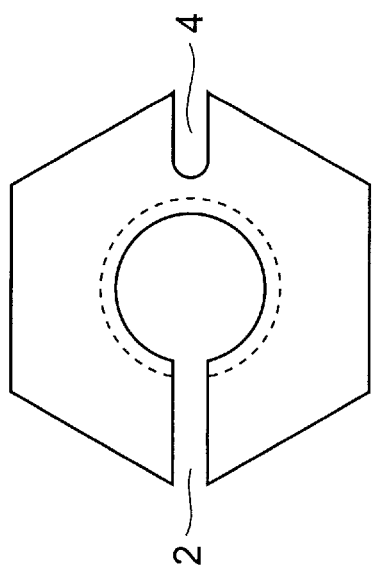
FIG. 5B
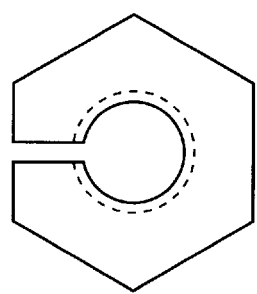
FIG. 2 (NON-ROUND)
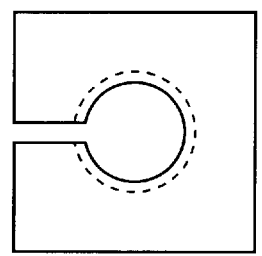
FIG. 4
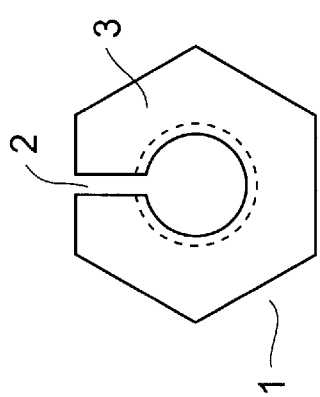
FIG. 1
FIG. 3 (TWISTED)

LOCKNUT

CROSS-REFERENCE TO RELATED APPLICATION

This is a continuation-in-part of application Ser. No. 09/244,185, filed Feb. 4, 1999 now abandoned, the disclosure of which is incorporated by reference.

BACKGROUND OF THE INVENTION

The present invention relates generally to fasteners, and more specifically to locknuts.

A limitation of most prior art locknuts is their limited reusability. That is, they can only be removed and re-installed a limited number of times. Indeed, as little as one re-use will substantially reduce their gripping torque. This is the case for locknuts with various types of deformed threads and with plastic inserts.

Other limitations of prior art locknuts include excess axial length and weight (compared to conventional nuts) and a substantial loss of gripping force when installed without protruding threads. This latter limitation is due to the fact that most screws and bolts have a few smaller diameter threads at their ends and prior art locknuts grip only at their axially outer portion.

As a matter of nomenclature, it is common to characterize a nut by its mean pitch diameter, which is defined by points halfway between the thread's minimum and maximum radial extents (i.e., halfway between the peak and the valley).

SUMMARY OF THE INVENTION

The Present Invention provides a locknut which offers several significant improvements over the prior art. Embodiments of the invention have high degree of reusability, can be made the same axial length and weight as conventional nuts, grip well even without protruding threads, can have the amount of grip easily adjusted by the user, and are less expensive than most prior art locknuts.

In short, a locknut according to the invention comprises a C-shaped nut with a radial gap cut through one side. It is useful to define the term "reference diameter" as the mean pitch diameter of a normal nut designed for use with the externally threaded element with which the locknut is intended to be used.

The locknut functionality is provided by one or more of the following features. In one set of embodiments, the threads of the nut are undersize relative to the reference diameter (i.e., have a mean pitch diameter less than the reference diameter). In another set of embodiments, the C-shape is deformed inward such that the internal threads are out of round until the nut is assembled on a screw. Upon assembly the radial gap permits the nut to expand to fit the screw while the resulting radial spring tension grips the screw. In another set of embodiments, the nut is twisted, axially displacing the threads on opposite sides of the gap. Upon assembly the nut assumes an untwisted shape and the resulting axial spring tension grips the screw.

A further understanding of the nature and advantages of the present invention may be realized by reference to the remaining portions of the specification and the drawings.

BRIEF DESCRIPTION OF THE DRAWINGS

FIG. 1 illustrates the invention in the form of a hex nut;

FIG. 2 illustrates an alternative version of the invention in which the C-shape is deformed inward;

FIG. 3 illustrates an alternative version of the invention in which the nut is twisted, axially displacing the threads on opposite sides of the gap; and FIG. 4 illustrates a square nut version of the invention;

FIGS. 5A and 5B illustrate hex nuts which are notched to improve compliance for variations in screw diameter.

DESCRIPTION OF THE SPECIFIC EMBODIMENTS

Referring to FIG. 1 the invention comprises a C-shaped nut 1 with a radial gap 2 cut through one side and undersize internal threads 3 such that the nut will grip a screw or other externally threaded object. The nut grips the screw by virtue of its undersize internal threads and its radial gap which permits it to expand like a spring to fit the screw. If desired, the undersize internal threads can be slightly widened at one axial end to ease assembly. In specific embodiments, the mean pitch diameter of the threads is undersize relative to the reference diameter (i.e., the mean pitch diameter of ordinary nuts intended for the same externally threaded object) by an amount on the order of 1%–2%.

The present inventor has tested a number of nuts made in this manner and found them to have better gripping torque and far better reusability than prior art locknuts. Furthermore, they provide excellent performance even without protruding threads. This allows application in situations where protruding threads are unacceptable. Furthermore, if desired, the user can easily adjust the amount of grip by either compressing or spreading the gap. This is easily accomplished with simple hand tools.

FIG. 2 illustrates an alternative version of the invention in which the C-shape nut is formed with normally sized threads, and is deformed inward such that the nut will grip a screw. This deformation causes the internal threads to be out of round until the nut is assembled on a screw. Upon assembly the radial gap permits the nut to expand to fit the screw. A deformation so as to cause a 1%–2% reduction in mean pitch diameter is generally suitable.

FIG. 3 illustrates an alternative version of the invention in which the nut is twisted, axially displacing the threads on opposite sides of the gap such that the threads of the nut will grip a screw. Upon assembly the nut assumes an untwisted shape and the resulting axial spring tension grips the screw. It is evident that the twisting needs to be about an axis that is perpendicular to the axis of the nut and that is not parallel with (preferably perpendicular to) an axis that passes diametrically through the gap. An axial displacement of about 1%–2% of the mean pitch diameter is generally suitable.

The invention and its alternatives are also applicable to many other types of nuts, for example nuts having a skirt or flange. In addition more than one of the alternative gripping methods can be combined into a single nut. For example the undersize threads of FIG. 1 can be combined with the twist of FIG. 3.

While the above is a complete description of specific embodiments of the invention, various modifications, alternative constructions, and equivalents may be used. For example, while the figures show slot 2 as having a medial plane that includes the thread axis, it is also possible to have the slot's medial plane inclined or offset relative to the thread axis. Therefore, the above description should not be taken as limiting the scope of the invention as defined by the claims.

FIGS. 5A and 5B illustrate hex locknuts in which a portion of the C-shape is formed with a notch 4 to improve compliance for variations in screw diameter. A typical notch depth is on the order of half of the radial thickness of the nut. When this notch is combined with the inward deformation of FIG. 2, a deformation of 5%–10% of the mean pitch diameter is generally suitable. Notched nuts have less variation in torque when threaded on screws of varying diameter than unnotched nuts. In the figures, notch 4 is positioned 180 degrees from slot 2, however, other positions may be employed.

What is claimed is:

1. A locknut for use with an externally threaded object comprising a C-shaped nut with a radial gap cut through one side and internal threads having a mean pitch diameter that is undersized relative to a reference diameter, such that the nut will grip an externally threaded object that is threaded for engagement with a normal nut having a mean pitch diameter equal to the reference diameter, wherein a portion of the C-shape is formed with a notch on the inside at a position spaced from the radial gap to improve compliance for variations in screw diameter.

2. The locknut of claim 1 wherein the internal threads are undersized by about 1%–2% of the threads' mean pitch diameter.

3. A locknut comprising a C-shaped nut with a radial gap cut through one side and internal threads, said C-shape deformed inward such that the nut will grip an externally threaded object, wherein a portion of the C-shape is formed with a notch on the inside at a position spaced from the radial gap to improve compliance for variations in screw diameter.

4. The locknut of claim 3 wherein the deformation is about 1%–2% of the threads' mean pitch diameter.

5. A locknut comprising a C-shaped nut with a radial gap cut through one side and internal threads, said nut twisted axially displacing the threads on opposite sides of the gap such that the threads of the nut will grip an externally threaded object, wherein a portion of the C-shape is formed with a notch on the inside at a position spaced from the radial gap to improve compliance for variations in screw diameter.

6. The locknut of claim 4 wherein the axial displacement is about 1%–2% of the threads' mean pitch diameter.

* * * * *